Nov. 17, 1964 F. SARMENTO ETAL 3,157,313
ELECTRICALLY OPERATED FEED METERING DEVICE
Filed April 19, 1962
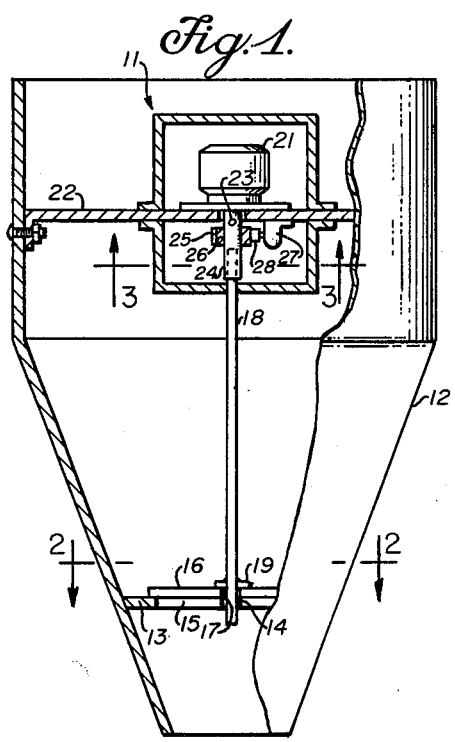
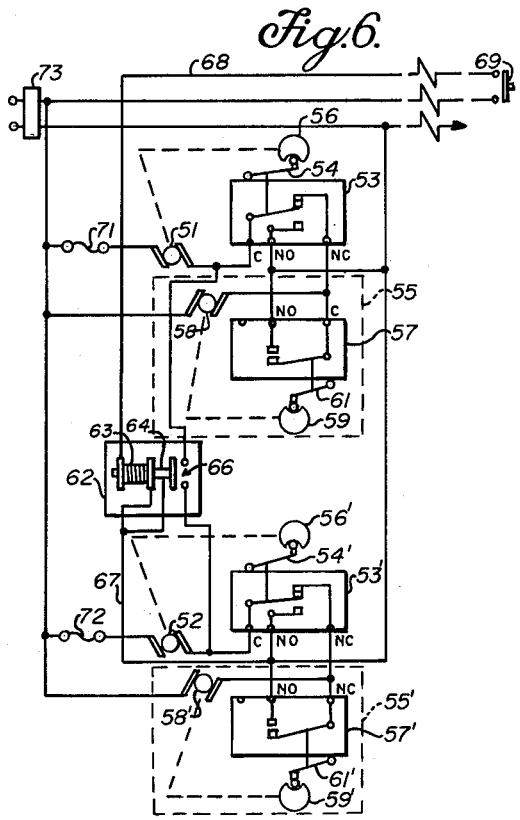
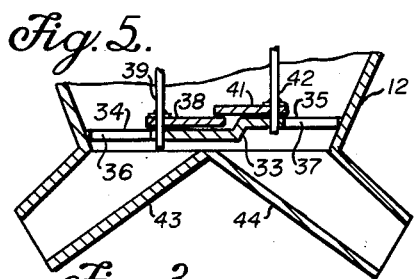
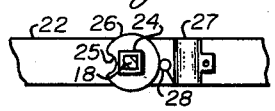
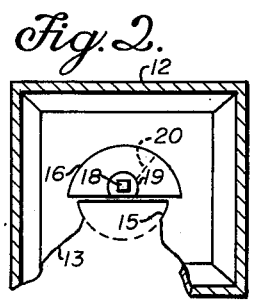
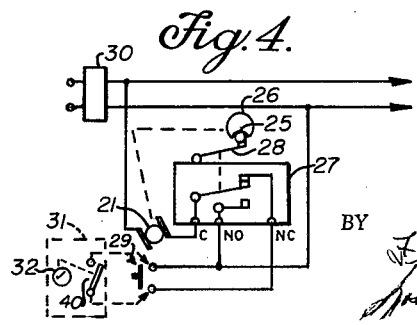
INVENTORS
FRANK SARMENTO
LOUIS B. ALMEIDA
BY
Frank Sarmento
Louis B. Almeida

United States Patent Office 3,157,313
Patented Nov. 17, 1964

3,157,313
ELECTRICALLY OPERATED FEED METERING DEVICE
Frank Sarmento, 7420 N. Central Ave., Winton, Calif., and Louis B. Almeida, Rte. 2, Box 2660, Turlock, Calif.
Filed Apr. 19, 1962, Ser. No. 188,814
7 Claims. (Cl. 222—70)

The present invention relates, in general, to automatic feeding systems for animals and, in particular, to an automatic, electrically operated feed metering device for use in dairy feeding systems for dispensing an apportioned amount of grain feed to animals.

This application is a continuation-in-part of our co-pending application Serial No. 101,712, filed April 10, 1961, now abandoned. The present invention is not limited to use with dairy feeding systems alone, but may be utilized in any grain feeding system, such as is commonly used for not only animals, but fowl.

The art of dairy farming has, in recent years, become highly specialized, requiring the use of modern, mechanized operation and management; particularly with regard to large dairy farms, so common today. As in other large businesses, rising costs, "mass production" competition, and sanitation requirements have forced the dairy farmer into accepting mechanized, time-saving feeding and milking procedures. The modern milking barn, or parlor, though highly mechanized, however, still requires a milking-man to manage and coordinate handling, milking, and feeding of the animals. Therefore, time is of utmost importance in milking operations (involving perhaps hundreds of dairy cows) and, wherein operating time and costs must be kept to a minimum with respect to production figures. Furthermore, in recent years research has proved the advantage of measuring the amount of feed to be given each cow on an individual basis, in accordance with her needs. A younger cow has to be fed more than an older one; cows that produce more milk have to be fed more; a cow that weighs more needs more feed; and cows that produce more fat in their milk have to be fed more.

A milking-man is therefore hard-pressed to handle all of the necessary operations within a milking barn and still cautiously measure and dispense, at the optimum time, the correct amount of grain feed to the animal being milked. Since correct feeding has proved to be exceedingly important from an economic viewpoint, tailoring the performance of the feeding apparatus with simple, permanent types thereof is likewise important. If more feed than is necessary is given each cow, the dairyman will lose money. If not enough feed is given to the cows, they will not produce at peak efficiency, resulting in a decrease in production.

Heretofore, all automatic livestock and fowl-feeding systems comprise a sequence of hoppers and feed transporting means therebetween and have employed a mechanical, feed metering device to feed a predetermined amount of grain from the hopper to the animal. Such prior art, a mechanical, feed metering devices utilize a ratcheting handle or a lever of some type, whereby operating same rotates a can, or other like container, to thereby dump a single, set amount of grain therefrom with each action of the handle or lever. Such mechanical leverage action tends to bind after a period of use, due to the fact that a mechanical linkage, or a cable and pulley system, is necessary in most feeder installations to allow operating the metering device from behind a cow when milking same. Furthermore, since a decided amount of physical effort is necessary to operate such metering devices, the binding of such linkage or cable and pulley system generally results in failure thereof.

Prior art mechanical metering devices not only require manual operation, but, further, must be operated each time a ration of feed is to be dumped.

The feed metering device of the present invention, however, overcomes the above shortcomings by providing an electrically operated system, which will feed one or more rations of feed to one or more cows, semi-automatically or automatically (depending on the embodiment employed), and can be operated at a substantial distance from the device itself with very little physical effort. The metering device utilizes no cumbersome mechanical linkage, or cable and pulley system, for operation thereof; but, instead, uses only an electrical cable and switch. The device employs a flat disc instead of a can, or like container, as used in prior art metering devices, for metering and dumping the feed; thus, binding is reduced to minimum, even after long periods of use. Furthermore, the present device passes feed directly from the main feed containing hopper in predetermined metered rations, therefore doing away entirely with the cumbersome can, or metering container, prevalent in prior art devices.

Therefore, it is an object of the present invention to provide an automatic feed metering apparatus, capable of individually or simultaneously feeding a predetermined amount of feed to a single or to a plurality of cows.

It is another object of the present invention to provide an automatic feed metering apparatus for dispensing a pre-selected amount of feed to a cow in accordance with her needs.

A further object of the present invention is to provide an electrically operated feed metering device, capable of adaption for operation with any conventional hopper type grain feeding system, as employed in animal and fowl raising farms.

It is a further object of the present invention to provide a feed metering device, capable of automatically dispensing an apportioned amount of grain feed to a cow being milked in direct proportion to the quantity of milk actually produced by her during the milking period.

It is still another object of the present invention to provide an electrically operated feed metering device which utilizes no mechanical levers or linkage to allow simple adaptation to remote control operation.

Yet another object of the present invention is to provide an electromechanical control circuit which will allow simultaneous or individual operation of a plurality of feeders. Still another object of the present invention is to provide an exceptionally durable electromechanical timer switch, which may be set either clockwise or counterclockwise.

Other objects and advantages of the present invention will be apparent in the following description and claims, considered together with the accompanying in which FIGURE 1 is a broken-out, cross-sectional view of an embodiment of the present invention, midway through one cycle of operation, FIGURE 2 is a cross-sectional view, taken along line 2—2 of FIGURE 1, FIGURE 3 is a cross-sectional view, taken along line 3—3 of FIGURE 1, FIGURE 4 is a schematic diagram of the associated electrical circuit and coacting mechanical components of the present invention in the non-operating or 'Off' position, FIGURE 5 is a partial, cross-sectional view of the metering discs and openings of a dual feeder embodiment, incorporating a double feed metering configuration within one hopper as taught by the present invention, FIGURE 6 is a schematic diagram of the associated electrical circuit and coacting mechanical components of the embodiment of FIGURE 5, and FIGURE 7 is a cross-sectional view of the slip-cam timer switch of the present invention.

Referring to the accompanying drawing, FIGURES 1, 2 and 3 show various views of a feed metering device 11 employed in a conventional, automatic feeder system as well-known in the art. It is to be noted that FIGURES 1, 2, 3, and 5 show the devices in the "On or operating positions; that is, in the position normally assumed when the devices are midway through one cycle of operation. FIGURES 4, 6, and 7 are drawn to depict the devices in "Off" or non-operating position. A hopper 12 contains the grain feed and acts as a mounting support for the metering device 11. The bottom end of the hopper 12 is closed by means of a steel plate 13, which has a round hole 14 drilled in the center thereof. A semi-circular feed opening 15 is cut through plate 13, as is shown in FIGURE 2. A semi-circular disc 16 of a diameter larger that the diameter of the feed opening 15 and having a square hole 17 machined therein is disposed flat upon the upper side of plate 13, with hole 17 and hole 14 coaxially aligned. A square shaft 18 rotates within the round hole 14 in plate 13 and fits snugly through the square hole 17 in the disc 16 to drive the disc 16 in rotatable relation to the plate 13. The shaft 18 has a shoulder, or washer 19 welded near its lower end, which washer lies upon disc 16 and prevents the shaft 18 from slipping through the holes 14 and 17. Thus, rotation applied to the shaft 18 causes the disc 16 to rotate upon plate 13 to thereby alternately cover and uncover the feed opening 15.

A low horse-power, low r.p.m., gear-head drive motor 21 is mounted upon a motor mount bracket 22, made of a flat steel plate or two lengths of parallel angle iron. The bracket 22 must be narrow in width to allow feed to enter the hopper 12 from the top, if such arrrangment is desired or necessary due to the configuration of the hopper and metering system. The gear-head motor shaft extends downwardly from the motor 21 to fasten, by means of a set-screw 23, to an adapter coupling 24. Coupling 24 is a piece of round pipe, one end of which fits snugly over the motor shaft to secure thereto, by means of screw 23, while the other end is formed into a square cross-section, so as to fit down over the upper end of the square drive shaft 18 in easily demountable relation. A notched wheel or cam 26 is pressed in fixed relation onto the round end of the coupling 24. A microswitch 27, having a microswitch actuating arm 28, is mounted in such relation to cam 26 that arm 28 rides against the circumference of same (FIG. 3). The microswitch 27 has a single-pole, double throw type of switch action, wherein the switching operation thereof is provided by pressing inwardly upon the microswitch actuating arm 28 by means of the cam 26. Each microswitch 27 has a "Normally Open" ("N.O."), a "Normally Closed" ("N.C.") and a "Common" ("C") contact, as do other microswitches discussed hereinafter. The cam 26, drive shaft 18 and disc 16 are assembled in such angular relation as to provide feed opening 15 with a cover (disc 16) at such time as the switch arm 28 drops into the notch 25 in cam 26 and stops the motor 21.

Referring to FIGURE 4, the schematic related electromechanical circuitry for a single metering device as installed in a feeder system is shown. It is to be understood that a multiplicity of such metering devices 11 (or hoppers 12), and thus a multiplicity of electromechanical circuits of FIGURE 4, can be installed in series to form a complete feed system within a milk barn. A push-button initiating switch 29 is physically located a substantial distance from the hopper as desired, depending upon the type of feeder installation, but is generally located behind the cow and/or near the milking-man to permit operating the metering device with no loss of time. One side of the switch 29 is wired to the "N.O." contact of the microswitch 27, and the other side is wired to the "N.C." contact of the microswitch 27.

The "C" contact of microswitch 27 is connected to one side of the motor 21; the other side of the motor 21 being connected to the hot wire of the motor energizing power supply, the latter preferably a standard 115 v. A.C. supply. The "N.O." contact is also connected to the ground wire of the power supply. A combination fuse box-main switch 30 is installed between the A.C. supply and the circuit of the present invention, whereby the circuit may be disengaged entirely at such time as the device is not in use.

In operation, the initiating switch 29 is momentarily pressed, energizing the drive motor 21 which begins rotation of shaft 18, cam 26, and disc 16. The actuating arm 28 of microswitch 27 is normally disposed in the notch 25 of cam 26 when the metering device 11 is not in operation. At such time no feed is dispensed; therefore, disc 16 covers the feed opening 15 to prevent passage of feed. Upon energizing drive motor 21, cam 26 rotates, thereby lifting the arm 28 out of the notch therein, closing the "N.O." contact of microswitch 27 and the circuit. Thus, microswitch 27 relieves switch 29 of its momentary circuit closing duty, and allows one rotation of the cam 26, shaft 18, and disc 16, to dispense one dump of feed. After a single rotation of disc 16, the mircoswitch arm 28 drops into the notch in cam 26 to open the circuit and stop drive motor 21. Thus, there is no need to continuously hold the initiating switch 29 during a metering cycle of the device, and the milking-man is free to continue his duties. Microswitch 27 may be wired as a single-pole single-throw switch by wiring the "N.O." and "C" contacts in electrical parallel with the initiating switch 29. When wired in such manner the "N.C." contact is not used at all.

There are two alternative switch means, either of which are employed in place of the push-button initiating switch 29. One such switch means is a timer switch, preferably a mechanical type with a time range of from zero to thirty seconds. In the present invention the speed of the drive motor 21 is picked to rotate the shaft 18 at 12 r.p.m., wherby a setting of five seconds or less on the timer switch allows one rotation of shaft 18 and disc 16, resulting in one dump of feed. Thus, for a timer setting of five seconds or less, one rotation of the disc 16 dispenses one dump of feed. Likewise, a timer setting between five and ten seconds results in two dumps; between ten and fifteen seconds, three dumps, etc. Therefore, a milking-man easily and quickly sets the timer switch to dispense the amount of feed to a cow in proportion to her need, with no subsequent manual supervision necessary. Again, closing the contacts on the timer switch starts the motor 21, and after the last feed dispensing cycle, the microswitch 27 shuts same off, as per previous description supra. The timer switch preferably utilized in the present invention is further described infra.

A second switch means which may be employed in place of push button switch 29 to close an electrical contact (and the circuit of the present invention) as does the timer switch supra, is a fluid flow switch 31 which is operated by the flow of milk from the milking cow to the milk storage tank. That is, a flow meter 42 is placed in the milking machine flow line, whereby passage of milk operates the flow meter (in the manner of gas flow meters, etc.), which upon turning drives a cam (or wheel with a suitable number of notches). A microswitch 40 is closed by action of the cam or wheel (in the manner of cam 26 and microswitch 27 supra), at periodic intervals in direct proportion to the quantity of milk passing through the flow meter 32, e.g., one gallon of milk rotates the can or wheel through an angle sufficient to close the microswitch 40 once and cause one dump of feed. Whereupon, microswitch 27 again relieves the microswitch 40 (of alternative fluid flow switch 31) to stop the drive motor 21 after one dump of feed. Thus, the fluid flow switch embodiment permits feed to be automatically dispensed to the cow in proportion to the amount of milk actually produced by her.

Referring now to FIGURE 5, there is shown a dual feeder embodiment of the present invention, incorporating two of the disc type feed metering configurations as taught by the invention. Such embodiment allows the mounting of two seperate feed metering devices within a minimum space in the bottom of one hopper 12, whereby two cows may be fed individually from one hopper. The hopper 12 is essentially the same as that described in FIGURE 1, with the possible exception of being larger in size. The bottom of hopper 12 is closed by means of a steel plate 33, which is stamped to form two, smooth, noncoplanar surfaces 34 and 35. Feed openings 36 and 37, identical to previously mentioned feed opening 15 of FIGURES 1 and 2, are formed in the steel plate 33. A semi-circular disc 38 is mounted on surface 34 and is rotated by means of a shaft 39, essentially as taught by the invention. Another semi-circular disc 41 is mounted with shaft 42 upon surface 35 to be rotated thereby. Surface 34 is situated lower in relation to surface 35 a distance slightly greater than the thickness of disc 38. Due to the shape of the steel plate 33 and the manner of mounting disc 38 and disc 41 upon the non-coplanar surfaces 34 and 35, respectively, such discs are free to operate either independently or simultaneously, although overlapping one another. Due to the fact that the discs overlap, only a minimum width is needed across the bottom end of the hopper 12 to mount same. Disc 38, upon rotating, opens feed opening 36, allowing feed to drop therefrom through a feed channel 43 to a trough below (not shown). Likewise, upon rotating disc 41, feed opening 37 passes feed therefrom into a feed channel 44 to a feed trough below. Shafts 39, 42 are simultaneously or individually driven by separate motors, and the associated electromechanical components of FIGURES 1, 3 and 4.

By inserting a vertical partition the length of the hopper 12 to divide same, and by properly directing the feed channels 43 and 44, the present invention is capable of dispensing two different feeds to a single animal, independently or simultaneously, by means of the separately driven discs and openings, as taught by the present invention.

It is specifically noted that the disc closing means described above (i.e., disc 16 of FIGURE 2, and discs 38, 41 of FIGURE 5) do not necessarily have to be semi-circular. The amount of feed metered and dispensed by the present device is regulated by the speed of the rotating disc 16, 38, 41 (or motor 21); the size of the feed opening, 15, 36, 37; and the angular width of the disc. Therefore, as shown in FIGURE 2 in phantom line, the disc 20, which is installed in an assembled feeder system, may have an angular width of less than 180°, the only further requirement being that such disc 20 be wide enough to cover the feed opening 15 when the device 11 is non-operating. Thus, a disc 20 when rotated at the same speed as disc 16 will leave feed opening 15 uncovered for a longer period of time, thereby feeding a larger portion of feed therethrough.

Referring to FIGURE 6, there is shown the electromechanical circuit associated with the dual feeder embodiment of FIGURE 5. The circuit is comprised essentially of a combination of two of the circuits of FIGURE 4, in conjunction with a solenoid relay switch and a slip-cam timer switch, which circuit allows the simultaneous operation of all the feeders and/or the individual operation of each feeder of the dual embodiment of FIGURE 5. More particularly, shaft 39 and 42 (FIGURE 5) are coupled to a drive motor 51 and a drive motor 52 respectively (FIGURE 6), in the manner previously described herein with respect to FIGURE 1. One wire from motor 51 is connected, through suitable fuse means, to the hot wire of the A.C. power supply. The other wire from motor 51 is connected to the "C" contact of a microswitch 53. Microswitch 53 has a switch actuating arm 54 bearing against, and operated by, the circumference of a cam 56; which cam 56 is coaxially pressed on the shaft 39. The "N.O." contact of microswitch 53 is connected to the ground wire of the A.C. power supply. The "N.C." contact of microswitch 53 is connected to the "C" contact of a timer microswitch 57. The "N.O." contacts of microswitches 53, 57 are also connected together.

A slip-cam timer switch 55 of previous mention is comprised of the timer microswitch 57, a low horsepower 1 r.p.m. output timer motor 58 and a slip-cam 59. One side of timer motor 58 is connected to the hot wire of the A.C. power supply, while the other side of timer motor 58 is connected to the "C" contact of timer microswitch 57. Timer microswitch 57 has a switch actuating arm 61 which rides against, and is operated by, the circumference of the slip-cam 59. The slip-cam timer switch 55 of FIGURE 6 replaces the push button initiating switch 29 of FIGURE 4. A push button switch may be installed in the dual feeder circuit embodiment if desired. However, use of the slip-cam timer switch 55 allows the automatic dispensing of a variable amount of feed with one mechanical setting of such timer switch; whereas the push button switch 29 must be actuated each time a dump of feed is desired.

Drive motor 52 is wired into a circuit similar to that of drive motor 51 above; wherein the components thereof comprise a microswitch 53′ (having "C," "N.O." and "N.C." contacts and connections thereto), a microswitch actuating arm 54′, a cam 56′ which is fixidly pressed coaxially onto shaft 42 (FIGURE 5) and which is rotated by action of motor 52, and a slip-cam timer switch 55′ comprise of a timer microswitch 57′ (having a "C" and "N.O." contacts and connections thereto) a microswitch actuating arm 61′, a low horsepower 1 r.p.m. output timer motor 58′, and a slip-cam 59′ rotated by action of timer motor 58′. The construction and operating theory of the slip-cam timer switches 55, 55′ is identical and is further described infra.

A solenoid relay switch 62 of previous mention is of the type wherein energizing a solenoid 63 causes a metal plunger 64 therewithin to operate to bridge a gap between two contacts 66 and thus complete an electrical circuit attached thereto. One of the contacts 66 is connected to the "C" contact of microswitch 53′, and the other of contacts 66 is connected to the "C" contact of microswitch 53. One side of the solenoid 63 is connected to the "N.O." contact of microswitch 53′ by means of wire 67; where also, wire 67 is electrically connected to the plunger 64. The other side of solenoid 63 is connected to a switch line 68 which extends from the solenoid of the first dual feeder to connect to similar solenoids (not shown) on various dual feeders (not shown) as installed within the milking barn to comprise the entire feeder system. The two A.C. lines as well as the switch line 68 are shown as fore-shortened in FIGURE 6 to indicate that any number of such dual feeders may be installed as hereinbefore described. However, for reasons of simplicity of presentation, only the circuitry for one dual feeder is herein described. A push button switch 69 is connected across switch line 68 and the hot wire of the A.C. power supply, and is physically located after the last dual feeder.

Suitable fuses 71 and 72 are placed in the circuit of motors 51, 52 respectively to protect same against overload. Likewise, a combination fuse box-main switch 73 is disposed between the circuit of the present invention and the source of A.C. power to provide protection, or to provide for disengagement of the circuit when the latter is not in use.

In operation, momentarily closing the push button switch 69 of the dual feeder circuit of FIGURE 6 connects the hot wire of the A.C. supply to the solenoid 63, whereby current flows therethrough, continues through wire 67, to the ground wire of the A.C. power supply. Upon energizing solenoid 63, plunger 64 is forced against contacts 66 to bridge same and allow current to then flow from the hot wire of the A.C. supply, through fuses 71, 72 and motors 51, 52 respectively, into the contacts 66, through the metal plunger 64, and through wire 67 to the ground wire of the A.C. supply. Thus drive motors 51, 52 are simultaneously energized to rotate shafts 39, 42 and uncover feed openings 36, 37 respectively, to thereby allow one dump of feed therethrough. As shafts 39, 42 rotate, the coaxial cams 56, 56' rigidly pressed respectively thereon also rotate, and microswitch actuating arms 54, 54' are displaced from their respective notches in the cams 56, 56' to drive the "C" contacts in microswitches 53, 53' away from the "N.C." contacts respectively therein. The initial circuit closing duty of switch 69 and solenoid relay switch 62 is relieved upon closure of the "N.O." contacts of the microswitches 53, 53' which latter provide a completed electrical path for flow of current through drive motors 51, 52 respectively as long as arms 54, 54' ride upon the smooth circumference of cams 56, 56' respectively. At such time as the arms 54, 54' drop into the notches of cams 56, 56' respectively, the "C" contacts of the microswitches 53, 53' are driven away from the "N.O." contacts and into touching relation with the "N.C." contacts respectively therein, and the energizing circuits for motors 51, 52 are opened. Since switch 69 is no longer closed, solenoid 63 is not energized and this circuit is likewise open; therefore drive motors 51, 52 are stopped after a single rotation of the shafts 39, 42 and integral cams 56, 56' respectively. Thus, it may be seen that closure of switch 69 tends to operate simultaneously all the drive motors of the dual feeders in a complete feeder system. A milking man therefore, may dispense feed to all the cows in the milking barn simply by closing push button switch 69. It is further to be noted that the present invention may comprise a combination of two sets of the dual feeder systems just described supra, including two switches (69), whereby one set of dual feeders on one side of a milking barn are simultaneously activated by closing one of the switches (69), while another set of duel feeders on the opposite side of the barn may be simultaneously operated by the other switch (69). Thus, while cows are being milked in one set of stalls, the set of duel feeders in stalls opposite thereto may have feed dispensed therein in preparation for entrance of the next set of cows, independently of the set of feeders of the occupied stalls.

At such time as the milking man prepares an individual cow for milking, it is necessary to feed the cow her apportioned amount of feed in accordance with her needs. This is done by setting the slip-cam timer switch 55 (or 55') to the proper setting. (For reasons of simplicity the operation of only one half of the dual feeder of FIGURES 5 and 6, viz., the feeder of slip-cam timer switch 55 and motor 51, will be described herein.) The slip-cam timer switch 55 has a graduated dial face with eleven settings (and a "Zero" or "Stop" position) as briefly described supra with regards to the possible timer switch of FIGURE 4. Setting the timer switch 55 rotates the timer slip-cam 59, which action displaces the actuating arm 61 from the notch in the slip-cam 59. Arm 61 movement drives the "C" contact of timer microswitch 57 into touching relation with the "N.O." contact therein. Closure of the "N.O." contact not only completes the energizing circuit to drive motor 51 to energize same, but simultaneously completes the energizing circuit to the timer motor 58. Upon being energized motor 51 rotates shaft 39 to dispense feed through opening 36. If the slip-cam timer switch 55 is set for one dump of feed (0 to 5 seconds on the timer face), the timer motor 58 will drive the cam 59 back to "Zero" or "Off" position (where actuating arm 61 drops into the notch in cam 59 and the "N.O." contact of microswitch 57 is opened). Upon completion of a single turn of shaft 39, arm 54 of microswitch 53 also drops into the notch of cam 56 to open the energizing circuit of motor 51, as previously described. Thus, since both the slip-cam timer switch 55 and the microswitch 53 have open circuits, the motor 51 stops and disc 38 is positioned to cover the feed opening 36 after the single dump of feed.

If more than one dump of feed is desired, slip-cam timer switch 55 is set to operate for a longer period of time, whereby the energizing circuit to motor 51 is kept closed by the timer microswitch 57 even when the microswitch 53 opens the circuit to the motor 51 after a complete turn of cam 56. For example, after one turn of cam 56, motor 51 is not stopped since the energizing circuit thereto is completed by closed contacts on timer microswitch 57. Thus, motor 51 will continue to operate and actuating arm 54 will drop into, and be displaced out of, the notch in the cam 56. Such action will continue as long as timer microswitch 57 contacts are kept closed by action of slip-cam 59 and arm 61; that is, until timer motor 58 drives the slip-cam 59 back through the predetermined time setting, to the "Zero" position and arm 61 drops into the notch in slip-cam 59.

The speed of rotation of the output shafts of the drive motor 51 and the timer motor 58 must be synchronized such that a zero to five second setting on the slip-cam timer switch 55 results in a single turn of the cam 56, and shaft 39. As previously noted, shaft 39 rotates at 12 r.p.m., or one turn per five seconds. Therefore, to obtain one turn of the shaft 39 (and one dump of feed) the timer switch 55 must be calibrated in 5 second time steps. If the shaft of the timer switch 55 rotates at one r.p.m., the dial face is divided into twelve steps (eleven "On" positions, and one "Off" or "Zero" position) wherein each step 1, 2, 3 etc. corresponds to 5, 10, 15 etc., seconds, and 1, 2, 3 etc. dumps of feed, respectively.

It is noted that although microswitches 53, 53' have been wired as shown utilizing a "C," "N.O." and "M.C." contacts, they may be wired to utilize only the "C" and "N.O." contacts therein, in a single pole, single throw manner as previously described with regard to the circuit of FIGURE 4. That is, the "C" contacts of microswitches 53 and 57 are connected together and the "N.O." contacts therein are connected together, to essentially place the two switches in electrical parallel. Motor 58 is connected to the "C" contact of microswitch 57 as described supra, and action of cam 56 and arm 54 drives the "C" contact of microswitch 57 to and from "N.O." contact therein.

FIGURE 7 shows a partially broken-out, cross section of the slip-cam timer switch 55 shown in electrical schematic in FIGURE 6, and comprising, for example, the timer motor 58, timer microswitch 57, actuating arm 61 and slip-cam 59. A shaft 74 of motor 58 extends approximately 1½ inches therefrom. Slip-cam 59 is drilled to define a coaxial bore 79 extending into, but not completely passing through, the slip-cam 59. The shaft 74 fits snugly into the bore 79, but must be sufficiently loose enough therein to allow free rotation between the slip-cam 59 and the shaft 74. Slip-cam 59 has a notch 76 formed into the otherwise smooth circumference thereof. The timer microswitch 57 is disposed such that the actuating arm 61 rides against the circumference of the slip-cam 59, and drops into the notch 76 when the cam 59 is rotated. A dial knob 77 is rigidly secured coaxially to the side of the slip-cam 59 opposite the bored side. A suitable dial face plate 78 is disposed about and between the integrally connected dial knob 77 and slip-cam 59. The dial face plate 78 is so calibrated to show the dial knob 77 in a "0" (or "Off") position at such time as arm 61 of microswitch 57 drops into notch 76 in slip-cam 59. A radially extending bore 81 is provided in slip-cam 59; wherein the radial bore 81 meets, in perpendicular relation, the axial bore 79 of the slip-cam 59. The outer half of the bore 81 is threaded, to match the threads of a setscrew 82. A small brass slug 83 of suitable dimensions to slide easily into bore 81, is placed therein to bear against the surface of shaft 74 when the timer switch 55 is assembled. An expansion spring 84 is disposed behind the slug 83 and the slug and spring are held in place by the set-screw 82. The friction exerted between slug 83 and the shaft 74 is regulated by the amount of pressure exerted upon the slug 83 by means of spring 84. Tightening the set-screw 82 against the spring 84 tends to increase the friction between the shaft 74 and slip-cam 59. Thus the degree of rotatable relation between the shaft and slip-cam may be varied to obtain the optimum operating friction relation therebetween. Such friction relation should be a value small enough to allow for rotation between the slip cam 59-dial knob 77 and the shaft 74, and yet should be a value large enough to permit the shaft 74 to turn the slip-cam 59 against the pressure of the actuating arm 61 of microswitch 57 during timer switch operation. That is, to allow setting the slip-cam the dial knob-slip-cam must be physically turned to the proper dial setting, but must not turn the shaft 74, since the latter is mechanically coupled to a gear box and forcing the shaft to turn would strip the gears within the gearbox. However, there must be sufficient pressure exerted by slug 83 on shaft 74 to permit the motor 58 to drive the shaft and slip-cam 59 back through the timer setting to the "Zero" or "Off" position.

It should be noted that the radial bore 81 is positioned to one side of slip-cam 59, and the microswitch 57 and arm 61 is positioned on the other, so that the arm 61 does not drop into the outer extremity of bore 81.

The configuration of the slip-cam timer switch 55 allows the milking man to set the timer dial knob 77 in a clockwise or counterclockwise manner. If a setting of "8" is desired, it is much simpler and efficient to go clockwise straight to the setting "8" rather than laboriously twist the knob 77 counterclockwise almost an entire 360 degrees. After being set the dial knob 77 is driven clockwise to the "zero" position.

While the invention has been disclosed herein with respect to a preferred and an alternate embodiment, it will be apparent that numerous variations and modifications may be made with the spirit and scope of the invention and, thus, it is not intended to limit the invention except by the terms of the following claims.

What is claimed is:

1. A feed metering device for use in grain feeding systems comprising a hopper, a plate disposed to close the bottom of said hopper, said plate having stepped parallel portions formed therein, said stepped parallel portions of said plate each having a feed opening disposed therethrough, a partial disc having an arcuate peripheral extent less than 180° disposed upon each of said portions to cover and uncover each of said feed openings upon rotation of said discs, said discs to be in stepped parallel relation to overlap one another when rotated, electric power means coupled to each of said discs to rotate either of the latter when the former are energized, and switch means connected between said electric power means and a power source to energize said power means upon closure of said switch means.

2. The combination of claim 1 wherein said switch means further comprises an intiating switch means connected between said power source and each of said electric power means, microswitch means mechanically operable by and in proportion to the rotation of each of said partial discs, said microswitch means each being electrically connected to relieve their respective intiating switch means and thereafter stop their respective electric power means.

3. The combination according to claim 2 further comprising a solenoid relay switch having normally open electrical contacts connected to said electric power means, said relay switch having a solenoid operably coupled to said normally open electrical contacts, a main switch electrically connected between said power source and said solenoid, wherein closure of said main switch energizes said solenoid and closes said normally opened electrical contacts to simultaneously energize said electric power means.

4. A feed metering device for use in grain feeder systems comprising a hopper, a plate disposed to close the bottom end of said hopper, said plate having a feed opening therein, a partial disc having an arcuate peripheral extent less than 360° mounted in rotatable relation to said plate to cover and uncover said opening upon rotation thereof, electric power means including an electric circuit coupled to said disc to rotate the latter, switch means comprising an adjustable internal timer switch having circuit closing contacts in the circuit of said electric power means, wherein the circuit closing contacts are closed for a time duration by a setting manually selected on said timer switch, and microswitch means mechanically operable by and coordinated with the rotation of said partial disc, said microswitch means electrically connected alternatively to either of said timer switch contacts to interrupt said power means when the time duration set on the timer switch is exceeded and the disc is covering said feed opening.

5. The feed metering device of claim 4, wherein said timer switch setting is manually selected to maintain said circuit closing contacts in the closed condition for a time duration sufficient to multiply rotate said disc past said feed opening.

6. A feed metering device for use in grain feeder systems comprising a hopper, a plate disposed to close the bottom end of said hopper, said plate having a feed opening therein, a partial disc disposed in rotatable relation to said plate to cover and uncover said opening upon rotation thereof, a shaft demountably secured to said partial disc, a motor demountably coupled to said shaft to rotate same upon energizing said motor, cam means integrally secured to said shaft to rotate therewith, a variable internal timer initiating switch electrically connected to said motor to energize same, power circuit means connected to said motor, electrical contacts connecting said initiating switch into said power circuit, said contacts responsive to close said power circuit and maintain operation of said motor in response to a time period set into said variable timer switch, and a microswitch electrically connected alternatively to either of said circuit contacts to open said power circuit and stop the motor when the time period set into said timer has expired, said microswitch further mechanically responsive to said cam means to open said power circuit contacts when said partial disc covers said opening.

7. The combination according to claim 6 wherein said microswitch is in a normally non-conducting state, and wherein closure of said variable timer initiating switch energizes said motor to rotate said cam means to operate said microswitch to a conducting state and wherein said microswitch is maintained in said state by said timer switch for a multiple number of rotations of said cam means.

References Cited by the Examiner
UNITED STATES PATENTS

| | | | |
|---|---|---|---|
| 1,964,235 | 6/34 | Watson | 222—510 X |
| 2,503,878 | 4/50 | Linn | 222—239 X |
| 2,527,136 | 10/50 | Kagi et al. | 222—57 X |
| 2,948,437 | 8/60 | Nielsen | 222—70 |
| 2,953,281 | 9/60 | Johnson | 222—70 |
| 2,975,937 | 3/61 | Totten | 222—70 |
| 3,045,719 | 7/62 | Burks et al. | 222—70 X |
| 3,060,289 | 10/62 | Gardes | 200—38 |
| 3,068,331 | 12/62 | Morrison et al. | 200—38 |

LOUIS J. DEMBO, *Primary Examiner.*

UNITED STATES PATENT OFFICE
CERTIFICATE OF CORRECTION

Patent No. 3,157,313                                  November 17, 1964

Frank Sarmento et al.

It is hereby certified that error appears in the above numbered patent requiring correction and that the said Letters Patent should read as corrected below.

Column 2, line 53, after "accompanying" insert -- drawing --; column 3, line 18, for "that" read -- than --; column 4, line 15, before "dispensed" insert -- to be --; line 58, for "42" read -- 32 --; column 6, line 31, for "comprise" read -- comprised --; column 10, lines 13 and 38, for "internal" each occurrence, read -- interval --.

Signed and sealed this 20th day of April 1965.

(SEAL)
Attest:

ERNEST W. SWIDER                                EDWARD J. BRENNER
Attesting Officer                                    Commissioner of Patents